US012045246B2

(12) United States Patent
Safaie et al.

(10) Patent No.: US 12,045,246 B2
(45) Date of Patent: Jul. 23, 2024

(54) DISTRIBUTED QUERIES THROUGH DYNAMIC VIEWS

(71) Applicant: Atscale, Inc., San Mateo, CA (US)

(72) Inventors: Rouzbeh Safaie, San Francisco, CA (US); Daniel J. Dosch, Santa Clara, CA (US); Joseph Barefoot, San Fransico, CA (US); Trystan R. Leftwich, Parramatta (AU); Matthew Baird, Belmont, CA (US); Sarah Gerweck, San Mateo, CA (US)

(73) Assignee: AtScale, Inc., Boston, MA (US)

( * ) Notice: Subject to any disclaimer, the term of this patent is extended or adjusted under 35 U.S.C. 154(b) by 133 days.

(21) Appl. No.: 17/529,898

(22) Filed: Nov. 18, 2021

(65) Prior Publication Data

US 2022/0164349 A1 May 26, 2022

Related U.S. Application Data

(60) Provisional application No. 63/116,351, filed on Nov. 20, 2020.

(51) Int. Cl.
*G06F 16/2458* (2019.01)
*G06F 16/2455* (2019.01)
*G06F 16/28* (2019.01)

(52) U.S. Cl.
CPC ...... *G06F 16/2471* (2019.01); *G06F 16/2456* (2019.01); *G06F 16/283* (2019.01)

(58) Field of Classification Search
CPC . G06F 16/2471; G06F 16/2456; G06F 16/283
See application file for complete search history.

(56) References Cited

U.S. PATENT DOCUMENTS

| | | | | |
|---|---|---|---|---|
| 11,216,511 B1 * | 1/2022 | Bigdelu | ................ | G06F 16/248 |
| 2001/0054042 A1 * | 12/2001 | Watkins | ................ | G06F 16/168 |
| 2005/0120021 A1 * | 6/2005 | Tang | ...................... | G06Q 30/02 |
| 2006/0136354 A1 * | 6/2006 | Bell | .................... | G06F 16/2471 |
| 2010/0223296 A1 * | 9/2010 | Angus | .................. | G06F 16/254 707/810 |
| 2012/0150791 A1 * | 6/2012 | Willson | ................ | G06F 16/254 707/600 |
| 2013/0238549 A1 * | 9/2013 | Aski | .................... | G06F 16/283 707/602 |

* cited by examiner

*Primary Examiner* — Mark D Featherstone
*Assistant Examiner* — Kweku William Halm
(74) *Attorney, Agent, or Firm* — Armis IP Law, LLC

(57) ABSTRACT

A data query and retrieval system receives a query request and identifies a plurality of data warehouses, or stores, where data needed to satisfy the query is stored. Data items, or fields, called for by the query request are grouped into sets based on fields stored at the same data warehouse. Individual data connections are generated for each data warehouse accessed, and a database view defined for the fields available at each respective data warehouse. The individual views are invoked in a single query statement by a query processor for accessing the respective data warehouses via the corresponding database view. In this manner, a query operator or user need not define multiple query expressions or perform separate queries for accessing data fields or dimensions residing at different data warehouses.

6 Claims, 6 Drawing Sheets

DISTRIBUTED QUERIES THROUGH DYNAMIC VIEWS

RELATED APPLICATIONS

This patent application claims the benefit under 35 U.S.C. § 119(e) of U.S. Provisional Patent App. No. 63/116,351, filed Nov. 20, 2020, entitled "DISTRIBUTED QUERIES THROUGH DYNAMIC VIEWS," incorporated herein by reference in entirety.

BACKGROUND

Electronic databases store tremendous amounts of data, and have been doing so for several decades ever since the cost of computer hardware came within reach for most businesses and consumers. Large "data warehouses" now store vast amounts of data stored and are indexed according to a storage format, often according to tables or multidimensional arrangements, and indices that allow access to the data though interfaces and software defined by the particular vendor.

SUMMARY

A data query and retrieval system receives a query request and identifies a plurality of data warehouses, or stores, where data needed to satisfy the query is stored. Data items, or fields, called for by the query request are grouped into sets based on fields stored at the same data warehouse. Individual data connections are generated for each data warehouse accessed, and a database view defined for the fields available at each respective data warehouse. The individual views are invoked in a single query statement by a query processor for accessing the respective data warehouses via the corresponding database view. In this manner, a query operator or user need not define multiple query expressions or perform separate queries for accessing data fields or dimensions residing at different data warehouses.

Configurations disclosed below therefore provide a method for querying a multidimensional database, including identifying, for each of a plurality of fields sought by a query request, a data warehouse where the sought fields are stored, and forming, for each data warehouse corresponding to the plurality of fields, a view indicative of the fields sought from the respective data warehouse. A query engine generates a query expression for retrieval of each of the fields sought by the query request by accessing the respective fields via the formed views.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Various configurations depicting the above features and benefits as disclosed herein are shown and described further below. Configurations disclosed herein allow for a query to obtain data from multiple data sources in a single request. The data sources may be completely different from each other. They can be a standard relational database, distributed database, a cloud based database or any other database or data warehouse accessible by the query engine. They can all be used seamlessly to bring data together and form the results the user requests.

Modern databases have benefited from advancements in computer networking technology to allow a distributed physical structure. While databases ultimately exist for the purpose of accessing particular data items as a single concise report or stream, the data so gathered may be stored in a multitude of different physical locations, ranging from the same file or table on a storage device, to different storage devices/disks that are part of the same physical assembly (i.e. rack mounted array), to tables in different physical locations joined by network connectivity. The term "data warehouse" may often be used to collectively refer to the aggregate body of distributed data accessible via a single set of control instructions, or DBMS (DataBase Management System). The DBMS and related synonyms (RDBMS, for Relational DBMS, Disk Farm) are often used to describe a common point or channel of control that regulates appropriate access to the data so stored for, in addition to robust query capability, access control and security.

Configurations herein are based, in part, on the observation that database managers (DBMS) emanate from different vendors, and owners of data often select a particular vendor's product for an individual usage, application or focus. While interoperability is often supported in the way of APIs (Application Programming Interfaces), data conversion approaches, and remote login capability, conventional approaches suffer from the shortcoming that it may not be a seamless process to access data across multiple vendor's platforms. Accordingly, configurations herein substantially overcome the shortcomings of separate data storage regimes by providing a query engine having multiple connections to each of a plurality of data warehouses, such that each data warehouse corresponds to a vendor imposed storage arrangement such as a DBMS.

Figure 1:
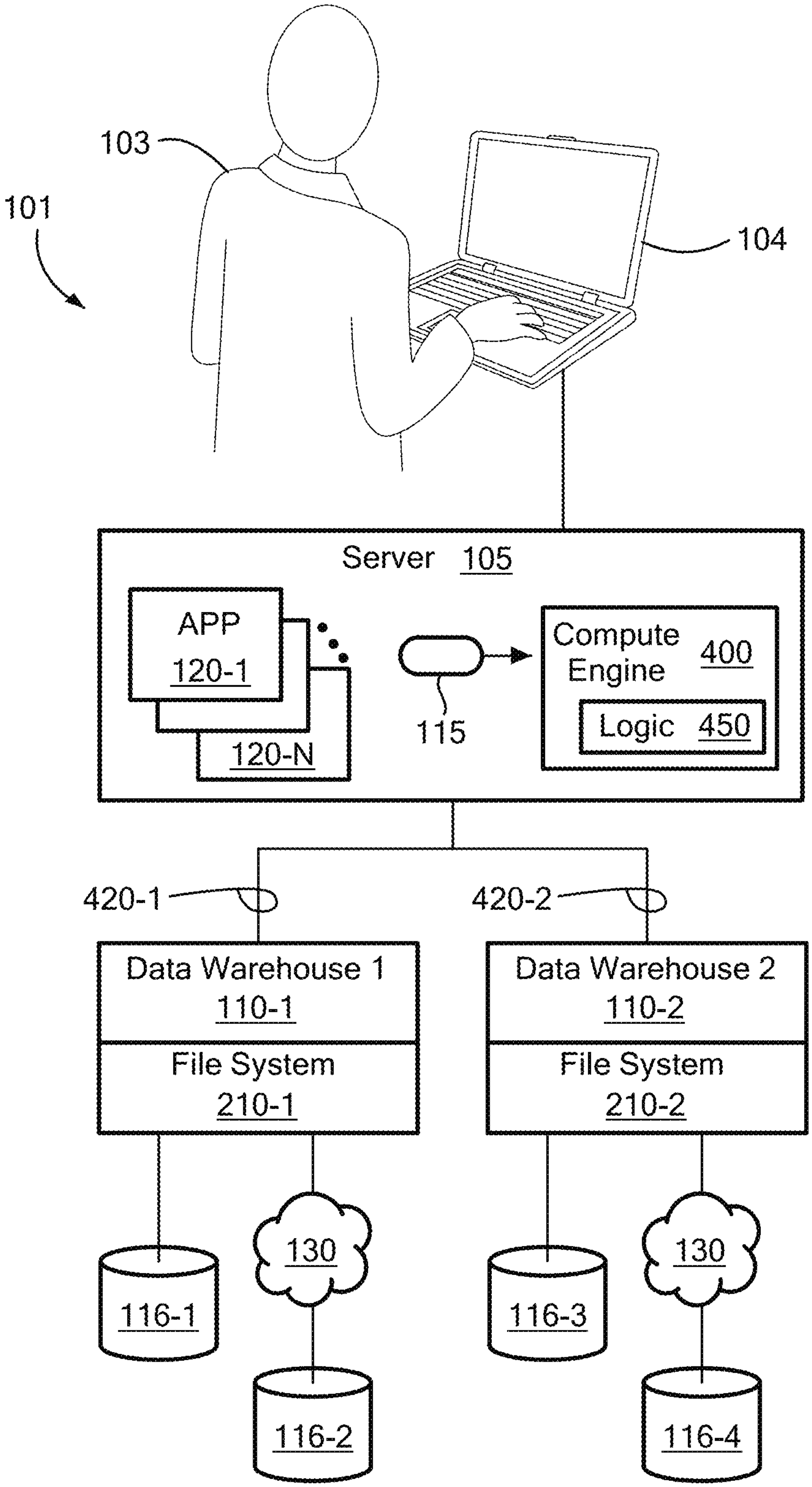
FIG. 1 is a context diagram of a database environment suitable for use with configurations herein.

FIG. 1 is a context diagram of a database environment suitable for use with configurations herein. Referring to FIG. 1, in a database environment 101, a user 103 employs a user device 104 for interacting with a server 105. The server 105 launches one or more applications (apps) 120-1 . . . 120-N (120 generally) for performing various tasks that invoke database exchanges via query requests. The server 105 also includes a compute engine 400 and query logic 450 for receiving the query requests and generating a query response, discussed further below. The apps 120 and compute engine 400 may occupy the same server 105 or computing device, or the app 120 may reside on a user machine and exchange remotely with the compute engine.

The compute engine 400 receives query requests 115 from the apps 120, based on a user request. In configurations herein, the query requests seek data that resides on multiple data warehouses 110-1 . . . 110-2 (110 generally). The compute engine 400 establishes a respective connection 420-1 . . . 420-2 (420 generally) to each data warehouse 110-N for accessing and returning the data stored thereby. Each data warehouse generally corresponds to a DBMS of a particular vendor, and may have different access and query syntax requirements. Each data warehouse 110 also accesses a file system 210-1 . . . 210-N, which physically stores the data and related indices and metadata. Any suitable physical arrangement and combination of storage media devices 116 may be included in the file system, and they may be distributed across different physical locations via a network 130.

Configurations herein identify, for each of a plurality of fields sought by a query request, a data warehouse 110 where the sought fields are stored, and forms, for each respective data warehouse 110 corresponding to the plurality of fields, a view indicative of the fields sought from the respective data warehouse, where each data warehouse has an independent access medium and storage domain. Stated differently, a view is defined to meet the vendor imposed syntax and access forms for the particular data warehouse 110. In general, the access medium is based on a set of control instructions for accessing the respective fields stored in the data warehouse, and may be fulfilled by a vendor specific DBMS or similar software. The storage domain is based on a storage repository under the control of the access medium, typically a collection of hard disk drives (HDD) or solid state drives (SSD), discussed further in FIG. 2.

The query logic 450 generates a respective subquery from the user request 115 based on each view of the plurality of views, where the subquery is for retrieval of each of the fields sought by the query request by accessing the respective fields via the formed view. Each subquery, therefore, seeks the fields available in the data warehouse to which it is directed.

Figure 2:
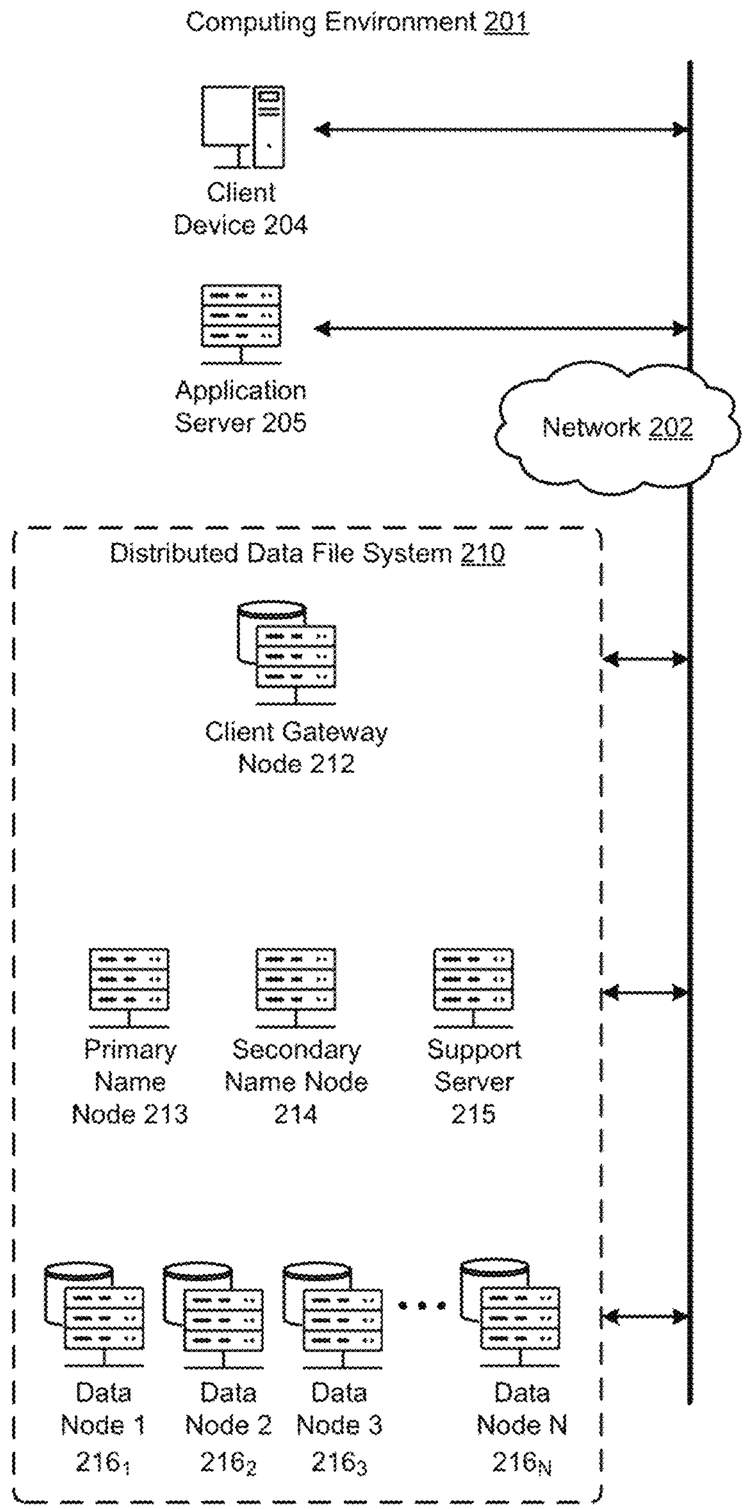
FIG. 2 is a block diagram of a file system supporting a data warehouse in the environment of FIG. 1.

FIG. 2 is a block diagram of an example file system supporting a data warehouse in the environment of FIG. 1; FIG. 2 is depicts a physical file storage system suitable for supporting the data warehouses of FIG. 1, however the extent of FIG. 2 is to illustrate the various physical storage domains that may underlie a particular vendor's DBMS. Configurations herein rest on the premise that the user need not know which tables and data warehouse(s) are invoked by the user request 115. Referring to FIGS. 1 and 2, the computing environment 201 comprises one or more instances of a client device 204 (e.g., a desktop computer), one or more instances of an application server 205, and one or more instances of a distributed data file system 210. The user application 120 and database 140 may comprise and/or operate in conjunction with a client device 204 and any number of physically distributed and networked storage entities, typically disk drives or SSD (solid state drive) devices.

The aforementioned devices, servers, and systems can communicate through a network 202 (e.g., a wireless network, a wide area network (WAN), a local area network (LAN), the Internet, an intranet, a private network, etc.). More specifically, the distributed data file system 210 can be configurable to store and process large volumes of data (e.g., using an HDFS framework) and comprise one or more instances of a client gateway node 212, one or more instances of a primary name node 213, one or more instances of a secondary name node 214, one or more instances of a support server 215 (e.g., executing data analysis processes, etc.), and a plurality of data nodes 216 (e.g., data node 1 216-1, data node 2 216-2, data node 3 216-3, to data node N 216-N). The distributed data file system 210 is configurable to store large files of data across multiple computing devices (e.g., the plurality of data nodes 216), rather than store all of the files on a single computing device with a large amount of storage capacity. To accommodate such distributed storage, the plurality of data nodes 216 can be configured with one or more rack-mounted servers coupled (e.g., using SATA or SAS interconnects) to multiple hard disk drives for storing the data.

As an example, when a file is loaded into distributed data file system 210, it is replicated and partitioned into "blocks" of data, which are distributed and stored across the plurality of data nodes 216. The primary name node 213 is responsible for storage and management of metadata associated with the distributed data file system 210, such that, for example, the primary name node 213 can provide data location information for data processing operations. Further, other configurations, partitions, and architectures of the distributed data file system 210 shown in computing environment 201 are possible. For example, a single-node implementation may have all of the nodes (e.g., client gateway node 212, primary name node 213, the plurality of data nodes 216, etc.) reside on a single computing device. Also, a small cluster of two nodes may have a first computing device operate as a name node and a second computing device operate as a data node. Further, the distributed data file system 210 can represent any database management system. Each connection 420 is made between the compute engine 400 and the data warehouse 110, assigned a view, and the file system 210 of each respective data warehouse (typically a vendor DBMS) accesses the physical data via the view.

Figure 3:
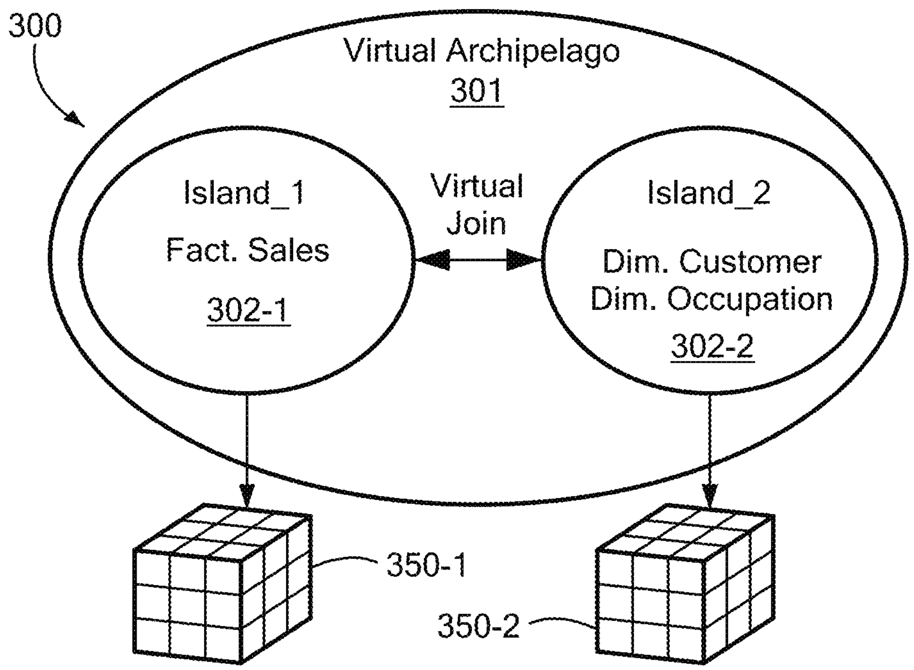
FIG. 3 is a modified Venn diagram of a multidimensional database, or datacube, environment suitable for configurations herein.

FIG. 3 is a modified Venn diagram of a multidimensional database, or datacube, environment suitable for configurations herein.

Referring to FIG. 1-3, a query approach 300 includes the following components Virtual island 302-1 . . . 302-2 (302 generally)

Virtual cube

Compute Engine 400

A virtual cube is an arrangement of dimensions of fields, each of which define a dimension of the virtual cube for multidimensional queries. Although the number of dimensions and records therein may be quite large, the stored data items are generally referenced in database tables indexed and arranged for defining the virtual cube.

In conventional approaches, query creation for the leaf (data containing) nodes of the virtual cube system was a manual process of column identification and joining of tables. The disclosed approach, in contrast, integrates a virtual "Island" system for joining together tables within the same data source connection 420, and aggregating the virtual islands into an "archipelago" satisfying the query request from data across different connections.

The general idea is to build the query by identifying a starting table and creating a virtual island 302 containing that table. As tables are joined, if they are on the same connection, they are added to that virtual island. When a table being joined requires a connection different from that island, a new island is created with that table. This process continues until all of the required tables have been joined together. This effectively creates a linked list of virtual islands, which we identify as a virtual archipelago 301 (literally meaning a "collection or set of islands").

Whenever the virtual archipelago consists of more than one island, hence needing multiple data warehouses to satisfy the query request 115, it takes each island and creates a view selecting the required columns from each table available at the respective connection 420. Any constraints and aggregations that can be pushed down into that table are also included in the view creation to benefit query performance. The virtualized query is then created joining these views together as if they were physical tables in a non-virtualized query. The disclosed method for querying a database includes identifying, for each of a plurality of fields sought by a view in a query request, a source, defined by a data warehouse where the sought fields are stored.

Summarizing the elements presented above, configurations herein present data sources, or simply a source, to be accessible by one connection. Each data source stores tables, including a starting table, aggregated into an island, meaning a group of tables at one source. A view encompasses all the tables in an island. Each table includes at least the fields, arranged in columns, needed for the query request. The table likely also contains other fields not called for by the query request. A virtual cube 350-1 . . . 350-2 (350 generally) assigns or creates a dimension for each field for an island. The virtual cube need only include dimensions called for by a respective query. The archipelago therefore is a grouping or list of islands, each island corresponding to a source.

Extending to an example query:

```
SELECT d1.customer_id, d1.customer_name, d2.occupation_id,
d2.occupation_name, sum(f1.sales)
FROM fact_sales f1
JOIN dim_customer d1
ON f1.customer_id = d1.customer_id
JOIN dim_occupation d2
ON d1.occupation_id = d2.occupation_id
GROUP BY 1, 2, 3, 4
```

Assume fact_sales comes from data source connection 1, and
dim_customer/dim_occupation come from data source connection 2.

This will create a Virtual Archipelago 301 as in FIG. 3. Island1 302-1 defines a view:

```
CREATE VIEW tmp_view_1
SELECT customer_id, sum(sales)
FROM fact1
GROUP BY customer_id
```

Island2 302-2 defines a view:

```
CREATE VIEW tmp_view_2
SELECT d1.customer_id, d1.customer_name, d2.occupation_id,
d2.occupation_name
FROM dim_customer d1
JOIN dim_occupation d2
ON d1.occupation_id = d2.occupation_id
```

The original query would then be turned into:

```
SELECT v1.customer_id, v2.customer_name, v2.occupation_id,
v2.occupation_name, v1.sales
FROM tmp_view_1 v1
JOIN tmp_view_2 v2
ON v1.customer_id = v2.customer_id
```

For computing a query response to a query request, therefore, each connection 420 is driven by a set of control instructions of the respective DBMS for accessing the set of tables in the respective data warehouse. Thus, the set of tables in one data warehouse are distinct from tables in other data warehouses accessible via other connections of the plurality of connections, meaning under the control of a particular DBMS. The query logic 450 defines an 302 island based on the set of accumulated tables at the respective data warehouse, and generates the archipelago 301 by defining an aggregation, such as a linked list or similar structure, for interconnecting the islands 302 corresponding to the plurality of connections.

Figure 4:
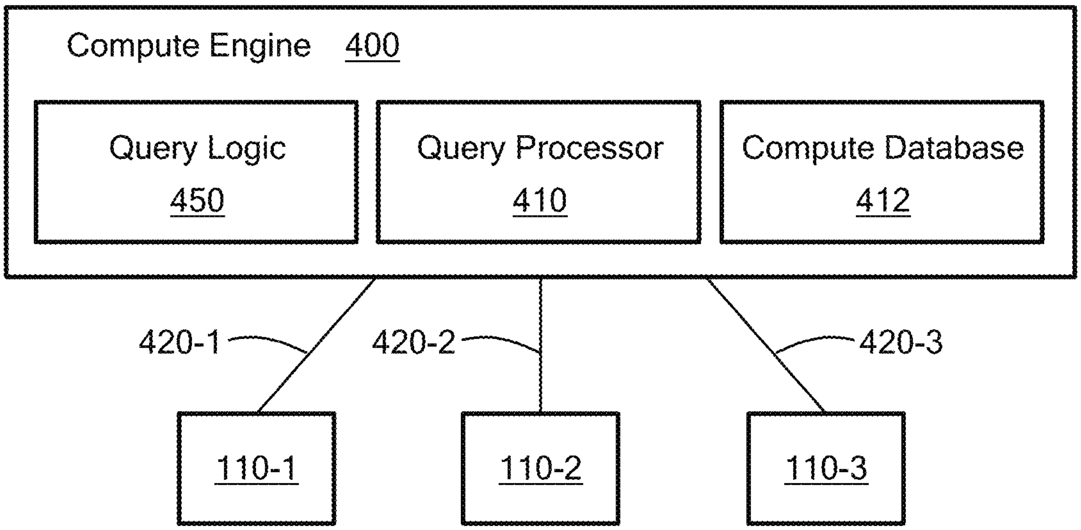
FIG. 4 shows a processing arrangement of a query engine as in FIG. 1 for querying a database as disclosed herein.

FIG. 4 shows a simplified processing arrangement of a query engine as in FIG. 1 for querying a database as disclosed herein. Referring to FIGS. 3 and 4, the query engine includes the compute engine 400, which has an interface, access or API to a query processor 410. In an example arrangement, a SPARK™ query implementation may be invoked, however other suitable query engines may also be used. The use of a query processor 410 avoids dissemination of sensitive login or access control information for the respective data warehouses.

The query engine 200 establishes connections 420-1 . . . 420-3 (420 generally) to each of data warehouses 110-1 . . . 110-3 (110 generally), and delegates subqueries as needed to the query processor 410. It then forms or defines, for each data warehouse corresponding to the plurality of fields, a view indicative of the fields sought from the respective data warehouse, and generates a query expression for retrieval of each of the fields sought by the query request by accessing the respective fields via the formed view, as now described with respect to FIG. 5.

Building on virtual tree based cube approaches, and making use of the virtual islands 302-1 . . . 302-2 (302 generally) system discussed above, the compute engine 400 invokes the query logic 450 that analyzes fields as the tree is being built to identify the sub-trees that reside within a single data source connection 420. As the tree is being built, if a join or a union involves data from different sources, the sub-trees being joined or unioned will be turned into compute views. The query will substitute a select from the view that is created, and the compute node will be able to do the appropriate data substitution at run time.

Figure 5:
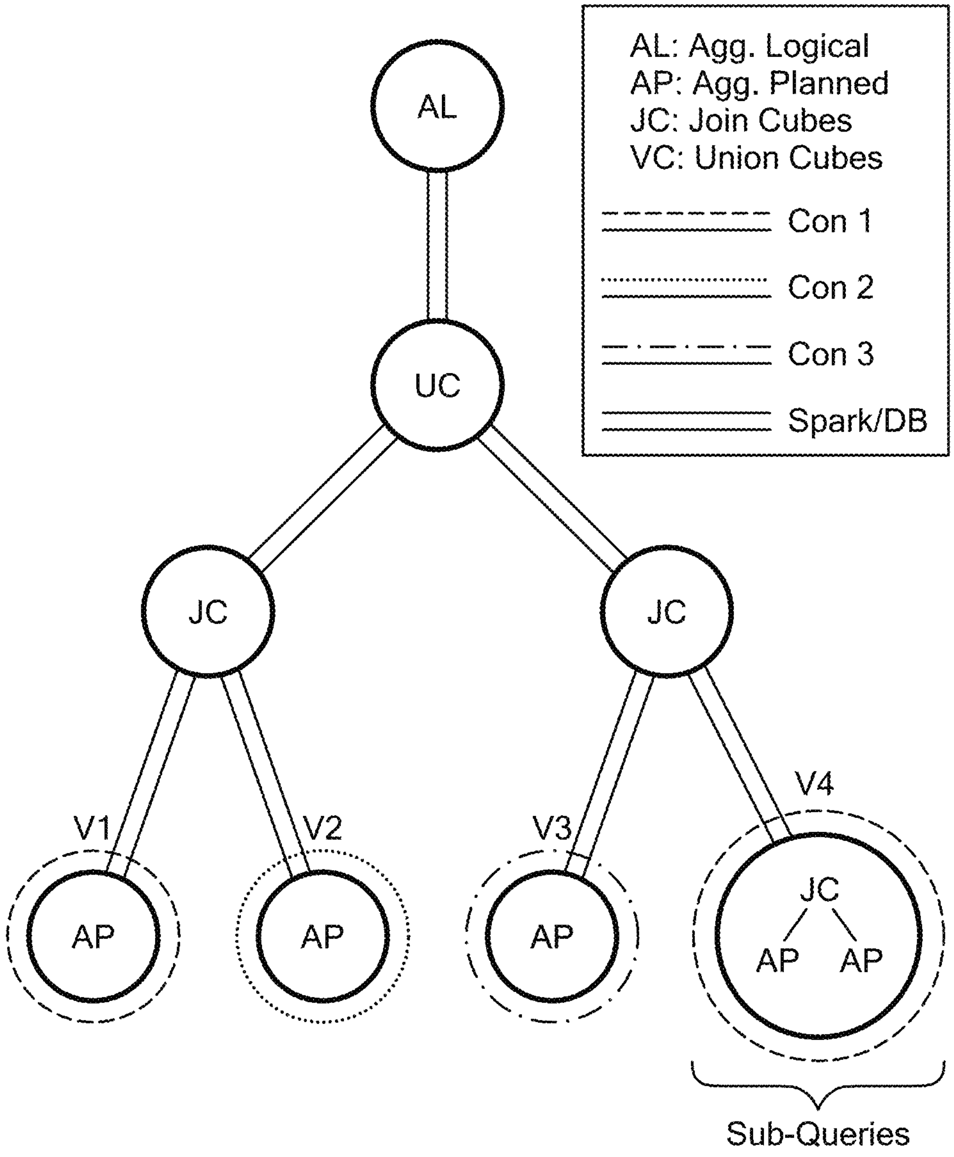
FIG. 5 shows an example subquery and connection arrangement based on a query request using the approach of FIGS. 1-4.

FIG. 5 shows an example subquery and connection arrangement based on a query request using the approach of FIGS. 1-4, In FIG. 5, the compute engine 400 performs query parsing and processing based on the query request 115 in the environment of FIGS. 1 and 2. From the query engine 400, multiple connections 420 exist to each of a plurality of data warehouses 110, such that each data warehouse corresponds to a vendor imposed storage arrangement, FIG. 3 shows satisfaction of a query request invoking each data warehouse 110. The compute engine 400 receives the query request 115 having a plurality of fields and one or more conditions, in which the conditions define selective retrieval of the data in the fields in a conditional syntax such as SQL.

The query logic 450 identifies, for each field of the plurality of fields, a source that stores the field. Each field is defined by one or more dimensions in the respective source. Each source is a data warehouse 110 or other repository, set of tables or collection configured for storing the field as a dimension of a multidimensional set of tables. The query logic 450 defines, for each of the identified sources, a view for accessing the fields stored in a respective source, and establishes a connection 420 to each source of a plurality of the sources. The compute engine 400, and/or invoking the query processor 450 as needed, accesses each of the sources via the established connection 420.

Referring to FIGS. 3-5, the example query involves three different data source connections. The query logic 450 forms a hierarchical structure 300 based on dependencies in the query request, and identifies, from the hierarchical structure 500, one or more sub-trees v1 . . . v4 corresponding to the same source 430 (data warehouse). It then forms a view corresponding to each of the sub-trees sharing the same source. A view generally corresponds to a subset or subquery of fields common to the respective source.

In FIG. 5, the lower leaf nodes v1-v4 denote subqueries. The bottom right section labeled v4 all emanate from the same connection coni. V1 is also accessible via v1, and may be accessed by the same connection Con 1. While building this query, we can identify all of that data comes from one database and build that subquery into a query. Then when it needs to be joined with the connection to v3, the subquery for v3 is also turned into a view. The join above it can then select from these two views to join the data together. Likewise v1 and v2 can also be joined together using views. These joins are then unioned and further aggregated to produce a final result.

In the example configuration, the compute engine 400 is a package wrapping an underlying database (Spark in the initial implementation). It has the responsibility of the view creation and delegation. When the create view requests are received, they contain all of the information required to get the data from the appropriate source.

This includes:

- the connection details
- the dialect
- the structure of the query results
- the fully planned textual query to be run, i.e query request character string Using this information, the compute engine 400 can make a request to the query processor 410 for sending the textual query and connection information. This allows the query logic 450 to manage all of the authentication and direct connections to the underlying datasource. None of this sensitive information has to be sent to the query processor. The results of the query are streamed back to the compute engine, which are then stored temporarily until all query results are generated based on subqueries from all connections 420.

Once all of the data has been retrieved from the views and put into temporary tables on a compute database 412, the final query can be run on the compute database itself, which then sends the final results.

This includes, for each source of the plurality of sources, establishing the connection 420 to a data warehouse 110 defining the source, accumulating a set of tables corresponding to the fields sought from the respective source, and forming a linked list of the set of accumulated tables corresponding to each connection. Using the generated views, the query logic 450, for each view, identifies a set of tables stored at the source that contain the fields, and iteratively accumulates the tables identified in the view by a join. In this manner, multiple dimensions are accumulated by traversing the joined tables. To materialize the query results, for each of the data warehouses, and hence for each view, the query logic substitutes a selection operation for each field called for by the view to effect retrieval.

In particular configurations, the delegation to the query processor 410 avoids authentication and access information such as passwords. The compute engine 400 may establish access via the connection 420 to the respective data warehouses 430, and permit the query processor 410 to perform computationally intensive tasks.

Figure 6:
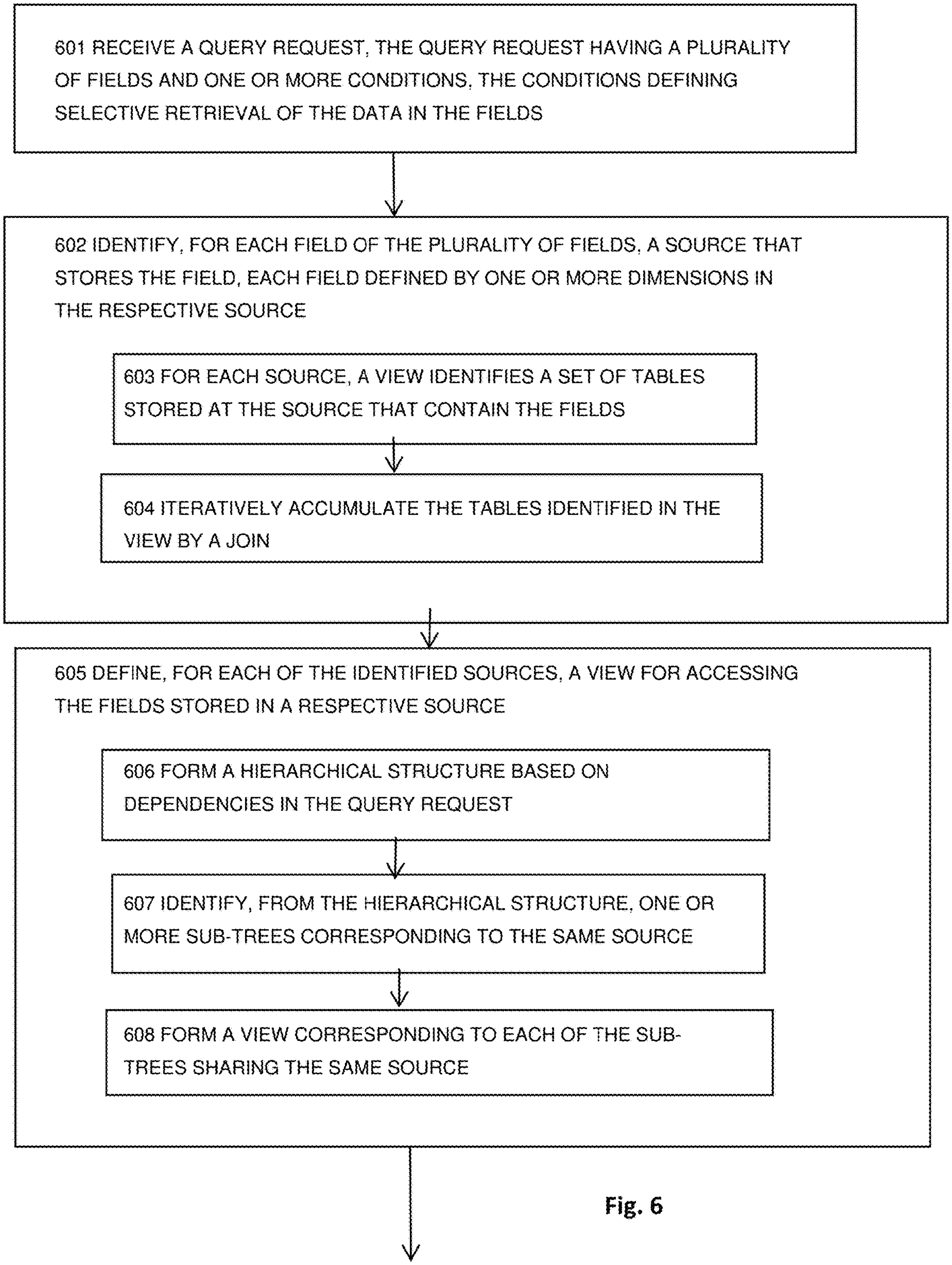
FIG. 6 is a flowchart of query processing as in FIGS. 1-5.
Figure 6:
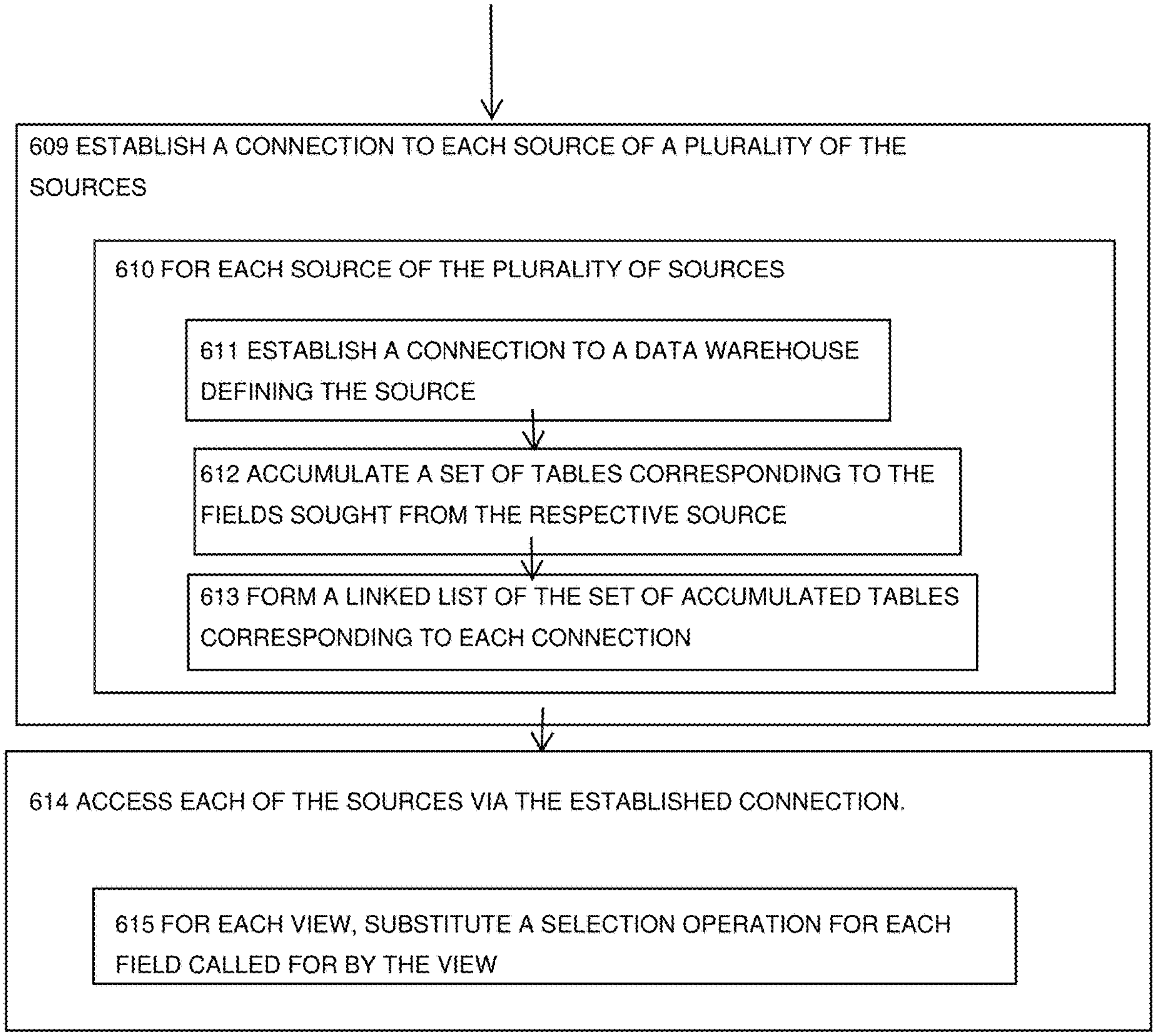

FIG. 6 is a flowchart of query processing as in FIGS. 1-5. Referring to FIGS. 1-6, at step 601, the compute engine 400 receives a query request 115 having a plurality of fields and one or more conditions, such that the conditions define selective retrieval of the data in the fields. This is typically a SQL or SQL-like construct. Query logic 450 identifies, for each field of the plurality of fields, a source that stores the field, in which each field is defined by one or more dimensions in the respective source, as depicted at step 602. Each source generally denotes a data warehouse 110. For each source, a view identifies a set of tables stored at the source that contain the fields, as disclosed at step 603. The query processor 410 iteratively accumulates the tables identified in the view by a join, as depicted at step 604.

The view is then defined for each of the identified sources for accessing the fields stored in a respective source, as shown at step 605. This includes forming a hierarchical structure based on dependencies in the query request, as depicted at step 606, and identifying, from the hierarchical structure, one or more sub-trees corresponding to the same source, shown at step 607 and described above with respect to FIG. 5 The query processor 410 forms a view corresponding to each of the sub-trees sharing the same source (step 608), corresponding to the island 302 structure discussed above. A connection 420 is defined, for each of the identified sources of the plurality of the sources needed for the query request 115, as depicted at step 609 Configurations herein are particularly beneficial when the connections pertain to data warehouse under different vendors. At step 610, for each source of the plurality of sources, the query processor 410 establishes a connection to a data warehouse 110 defining the source, as depicted at step 611 and accumulates a set of tables corresponding to the fields sought from the respective source, shown at step 612. The query processor aggregates the collective connections (the "islands" described above) by forming a linked list of the set of accumulated tables corresponding to each connection, as depicted at step 613. The query proceeds by accessing each of the sources via the established connection, as disclosed at step 614. This may include, for each view, substituting a selection.

By forming different views to each warehouse or repository, computer operation and efficiency are improved by executing fewer instructions than would be required for accessing each data warehouse separately with a source-specific query.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In a query engine having multiple connections to each of a plurality of data warehouses, each data warehouse corresponding to a vendor imposed storage arrangement, a method of satisfying a query request invoking each data warehouse, comprising:

receiving a query request, the query request having a plurality of fields and one or more conditions, the conditions defining selective retrieval of the data in the fields;

identifying, for each field of the plurality of fields, a source that stores the field, each field defined by one or more dimensions in the respective source;

defining, for each of the identified sources, a view for accessing the fields stored in a respective source;

forming a hierarchical structure based on dependencies in the query request;

identifying, from the hierarchical structure, one or more sub-trees corresponding to the same source;

forming a view corresponding to each of the sub-trees sharing the same source, further comprising, for each view, identifying a set of tables stored at the source that contain the fields;

iteratively accumulating the tables identified in the view by a join establishing a connection to each source of a plurality of the sources;

accessing each of the sources via the established connection;

defining a multidimensional cube for each respective source, the multidimensional cube including a dimension for each field of the query request stored in a table in the respective source;

aggregating a plurality of the multidimensional cubes for each source called for by the query request;

executing a subquery based on the respective subtree using the respective multidimensional cube; and performing a join of the results of each multidimensional cube for generating a result set for the query request.

2. The method of claim 1 further comprising for each view, substituting a selection operation for each field called for by the view.

3. In a query engine having multiple connections to each of a plurality of data warehouses, each data warehouse corresponding to a vendor imposed storage arrangement, a method of satisfying a query request invoking each data warehouse, comprising:

receiving a query request, the query request having a plurality of fields and one or more conditions, the conditions defining selective retrieval of the data in the fields;

identifying, for each field of the plurality of fields, a source that stores the field, each field defined by one or more dimensions in the respective source;

defining, for each of the identified sources, a view for accessing the fields stored in a respective source;

establishing a connection to each source of a plurality of the sources:

further comprising, for each source of the plurality of sources, establishing a connection to a data warehouse defining the respective source:

accumulating a set of tables corresponding to the fields sought from the respective source; and forming a linked list of the set of accumulated tables corresponding to each connection, wherein each connection corresponds to a set of control instructions for accessing the set of tables in the respective data warehouse, the set of tables distinct from tables in other data warehouses accessible via other connections of the plurality of connections, further comprising:

defining an island based on the set of accumulated tables at the respective data warehouse; and defining the linked list for interconnecting the islands corresponding to the plurality of connections; and accessing each of the sources via the established connection.

4. A network device including a query engine having multiple connections to each of a plurality of data warehouses, each data warehouse corresponding to a vendor imposed storage arrangement, a method of satisfying a query request invoking each data warehouse, comprising:

an interface to a user application for receiving a query request, the query request having a plurality of fields and one or more conditions, the conditions defining selective retrieval of the data in the fields;

query logic for identifying, for each field of the plurality of fields, a source that stores the field, each field defined by one or more dimensions in the respective source;

the query logic further configured for defining, for each of the identified sources, a view for accessing the fields stored in a respective source;

query logic for forming a hierarchical structure based on dependencies in the query request, and identifying, from the hierarchical structure, one or more sub-trees corresponding to the same source, the query processor further configured to form a view corresponding to each of the sub-trees sharing the same source, wherein, for each view, the query logic identifies a set of tables stored at the source that contain the fields, and iteratively accumulates the tables identified in the view by a join;

a query processor for establishing a connection to each source of a plurality of the sources, and accessing each of the sources via the established connection;

a multidimensional cube for each respective source, the multidimensional cube including a dimension for each field of the query request stored in a table in the respective source;

the query logic further including instructions for:

aggregating a plurality of the multidimensional cubes for each source called for by the query request;

executing a subquery based on the respective subtree using the respective multidimensional cube; and performing a join of the results of each multidimensional cube for generating a result set for the query request.

5. The device of claim 4 wherein the query processor is operable to, for each view, substitute a selection operation for each field called for by the view.

6. A network device including a query engine having multiple connections to each of a plurality of data warehouses, each data warehouse corresponding to a vendor imposed storage arrangement, for satisfying a query request invoking each data warehouse, comprising:

an interface to a user application for receiving a query request, the query request having a plurality of fields and one or more conditions, the conditions defining selective retrieval of the data in the fields;

query logic for identifying, for each field of the plurality of fields, a source that stores the field, each field defined by one or more dimensions in the respective source;

the query logic further configured for defining, for each of the identified sources, a view for accessing the fields stored in a respective source;

a query processor for establishing a connection to each source of a plurality of the sources, the query logic is configured to, for each source of the plurality of sources, establish a connection to a data warehouse defining the respective source;

accumulate a set of tables corresponding to the fields sought from the respective source; and form a linked list of the set of accumulated tables corresponding to each connection, wherein each connection corresponds to a set of control instructions for accessing the set of tables in the respective data warehouse, the set of tables distinct from tables in other data warehouses accessible via other connections of the plurality of connections, further comprising:

an island define based on the set of accumulated tables at the respective data warehouse; and a linked structure for interconnecting the islands corresponding to the plurality of connections; and accessing each of the sources via the established connection.

* * * * *